(12) United States Patent
Hupp et al.

(10) Patent No.: US 10,161,729 B1
(45) Date of Patent: Dec. 25, 2018

(54) PORTABLE IED TRAINING DEVICE

(71) Applicants: Mark R. Hupp, Lemon Grove, CA (US); Andrew L. Bottrell, San Diego, CA (US); Michael G. Anderson, San Diego, CA (US)

(72) Inventors: Mark R. Hupp, Lemon Grove, CA (US); Andrew L. Bottrell, San Diego, CA (US); Michael G. Anderson, San Diego, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 422 days.

(21) Appl. No.: 15/054,213

(22) Filed: Feb. 26, 2016

(51) Int. Cl.
*F42B 8/04* (2006.01)
*F41A 33/00* (2006.01)
*G09B 9/00* (2006.01)

(52) U.S. Cl.
CPC ............... *F42B 8/04* (2013.01); *F41A 33/00* (2013.01); *G09B 9/003* (2013.01)

(58) Field of Classification Search
CPC ............ F42B 8/04; F41A 33/00; G09B 9/003
USPC .......................................................... 434/11
See application file for complete search history.

(56) References Cited

U.S. PATENT DOCUMENTS

| 7,703,230 | B2 | 4/2010 | Curry et al. | |
| 8,978,561 | B1 * | 3/2015 | Illston | F41B 11/60 102/498 |
| 2011/0088539 | A1 | 4/2011 | Oz | |

* cited by examiner

*Primary Examiner* — Robert P Bullington
(74) *Attorney, Agent, or Firm* — SSC Pacific Patent Office; Arthur K. Samora; Kyle Eppele

(57) ABSTRACT

An IED detection training device can include a barrel which can be adapted to receive a blank ammunition cartridge. A housing can be connected to the barrel, and a firing pin having a tab extending from the firing pin can be disposed in the housing. A spring can surround the firing pin, and a sleeve having a slot can surround the sleeve so that the firing pin tab is disposed in the sleeve slot. A lever can be pivotably attached to the housing so that the lever selectively engages the tab. A pull ring can also be pivotably attached to the housing, to selectively engage the lever. Pivoting of the pull ring can cause pivoting engagement of the lever and disengagement of the tab, which can further cause the spring to move the firing pin forward to strike the ammunition blank cartridge.

16 Claims, 5 Drawing Sheets

PORTABLE IED TRAINING DEVICE

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil, referencing NC 103721.

FIELD OF THE INVENTION

The present invention pertains generally to training devices. More specifically, the present invention pertains to training devices for detection of improvised explosive device (IED's), which can have a small form factor, for ease of use and transport. The present invention is particularly, but not exclusively, useful as a portable handheld IED detection training device, which can utilize standard blank ammunition rounds as the detonating charge instead of blasting caps and explosives, and which can receive its detonating trigger from either electronically activated sensor inputs or from a mechanical means such as a trip wire.

BACKGROUND OF THE INVENTION

Training devices for IED detection are well known in the prior art. But prior art IED training devices are often bulky and difficult to carry. Additionally, many IED training devices can use a blasting cap and explosive charge for operation, which can create the additional burden (and hazard) of transporting the charge and caps along with the IED training device.

In view of the above, it can be an object of the present invention to provide an IED detection training device that can be very small in size, and that can utilize standard blank ammunition rounds or primers as the detonating charge. Another object of the present invention can be to provide an IED detection training device that can receive its detonating trigger from either electronically activated sensor inputs or mechanical means such as a trip wire. Another object of the present invention can be to provide an IED detection training device that is portable and that can be carried and transported by a remote user in the field. Still another object of the present invention can be to provide an IED detection training device that can be used remotely by personnel in the field, including but not limited to Explosive Ordnance Disposal, Combat Engineers, basic infantry and law enforcement in situations where portability of the device and availability of activating charges (blanks) are paramount. Another objective of the present invention can be to provide an IED detection training device, and which can be easy to manufacture and use in a cost-effective manner.

SUMMARY OF THE INVENTION

An IED detection training device and methods for use therefor can include a barrel which can be adapted to receive a blank ammunition cartridge. A housing can be connected to the barrel, and a firing pin can be disposed in the housing. The firing pin can have a proximal end and a distal end, and a tab can extend from the proximal end. A spring can surround the firing pin, and a sleeve having a proximal end and a distal end and being formed with a sleeve slot in the sleeve proximal end can surround the spring and firing pin so that the tab is disposed in the sleeve slot. A lever with a ring end and a tab end can be pivotably attached to the housing so that the lever tab end selectively engages the tab. A pull ring can also be pivotably attached to the housing, to selectively engage with the ring end of the lever.

The pull ring can be formed with a ring portion, which can merge into a midsection and further into an elbow that can extend perpendicularly from the midsection. When in a cocked configuration in the pull ring elbow can establish a contact plane with the lever distal end, while the lever proximal end can be the proximal end of the lever is engaged with the tab, and the spring can be compressed. To fire the device, the pull ring can be pivoted (either manually with a tripwire or remotely with a solenoid), to cause the pull ring to pivot, which can further cause the lever to pivot and disengage the tab, which can further cause the spring to relax, which forces the firing pin forward to strike the ammunition blank cartridge primer.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
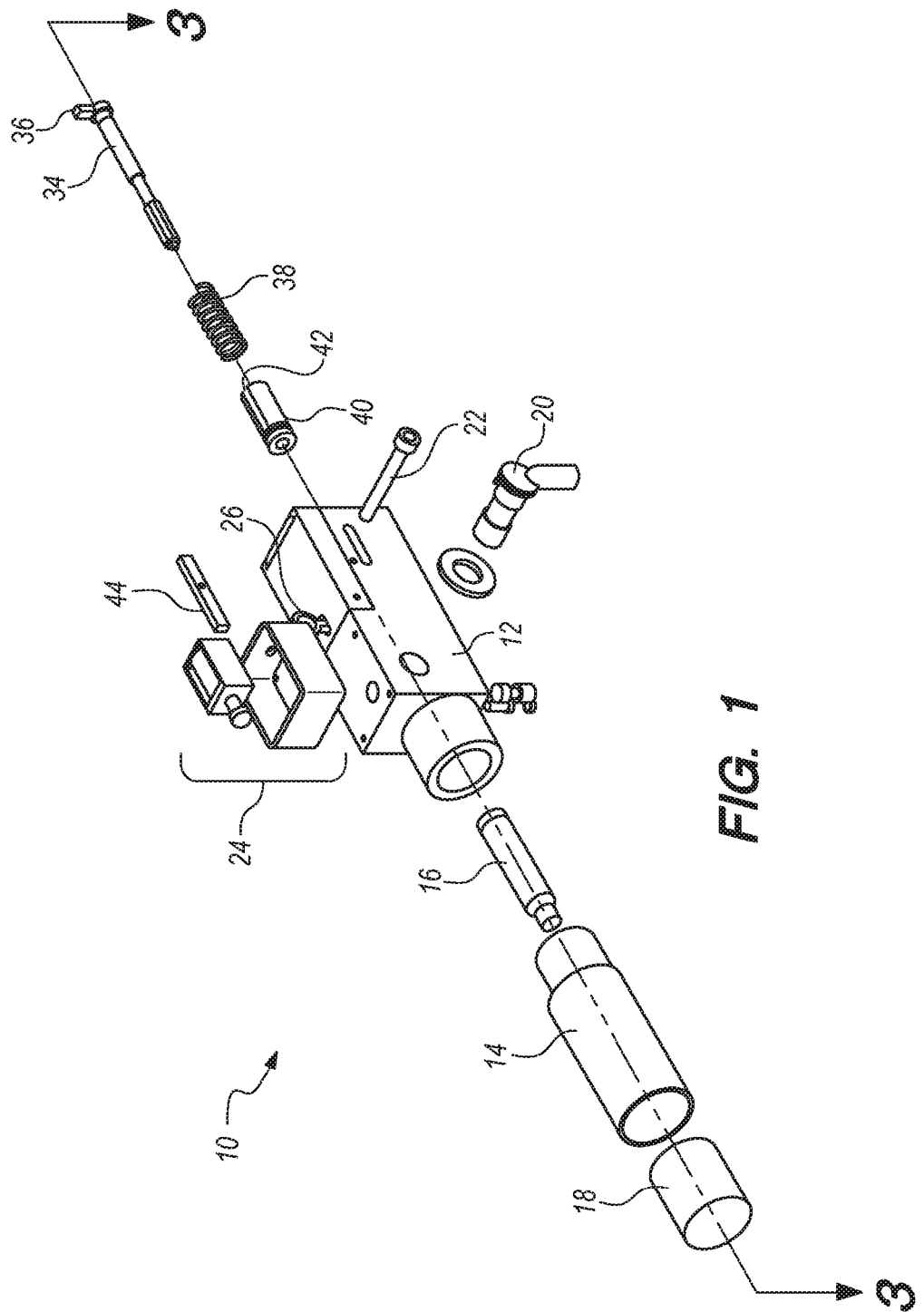
FIG. 1 is an exploded side elevational view of the portable IED training device of the present invention according to several embodiments.
Figure 2:
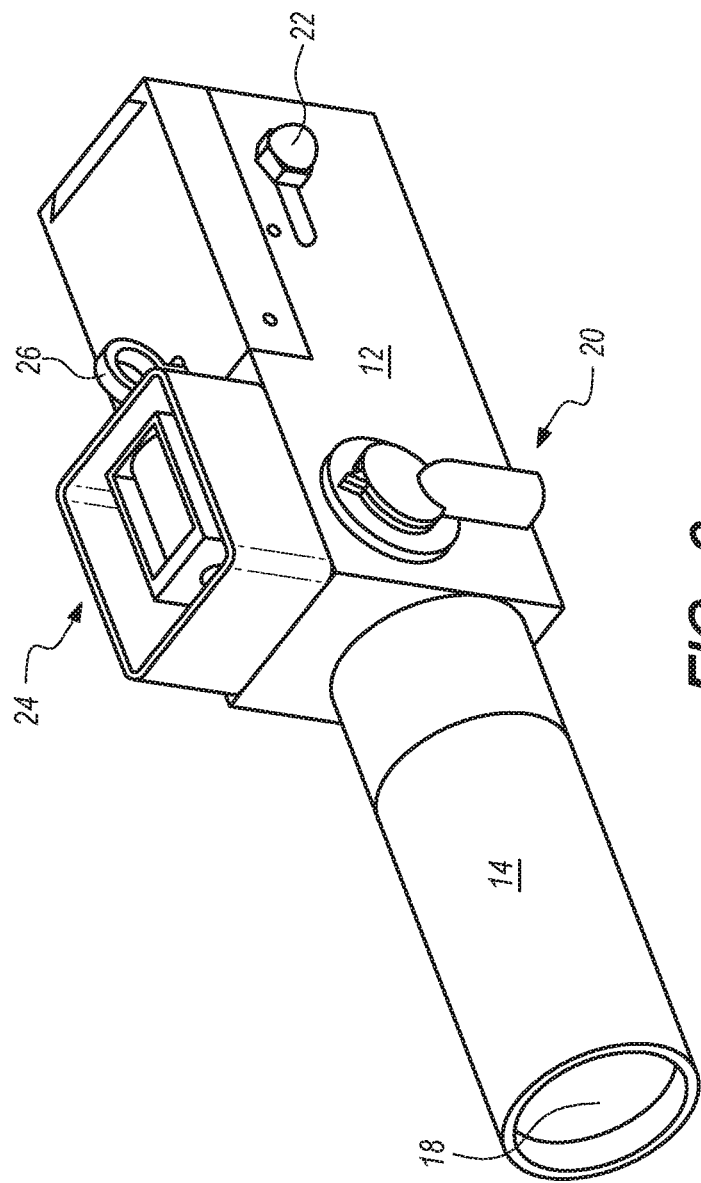
FIG. 2 is a side elevational view of the portable IED training device of FIG. 1 when assembled.

Referring initially to FIGS. 1-2, a portable, handheld improvised explosive device (IED) detection training device is shown and is shown and is generally designated by reference character 10. As shown in FIGS. 1 and 2, device 10 can have a housing 12, and a barrel 14 can be fixed to housing, typically by being threaded onto housing 12, although other means of fixing barrel 14 to housing 12 are certainly possible. Barrel 14 can be sized and shaped to receive a blank ammunition cartridge 16 as shown in FIG. 1. A cap 18 can be inserted into the distal end of barrel 14. The device 10 can further include a mechanical safety 20 for preventing operation of the device 10. As shown in FIGS. 1 and 2, the device of the present invention according to several embodiments can further include a return bolt 22 for resetting the device 10 from a fired configuration to a cocked configuration. The structure and cooperation of structure for the fired and cocked configurations can be described more fully below. A solenoid 24 can be fixed to the exterior of housing 12, and a pull ring 26 can be included as an alternative means of firing the device 10, as described more fully below.

Figure 3:
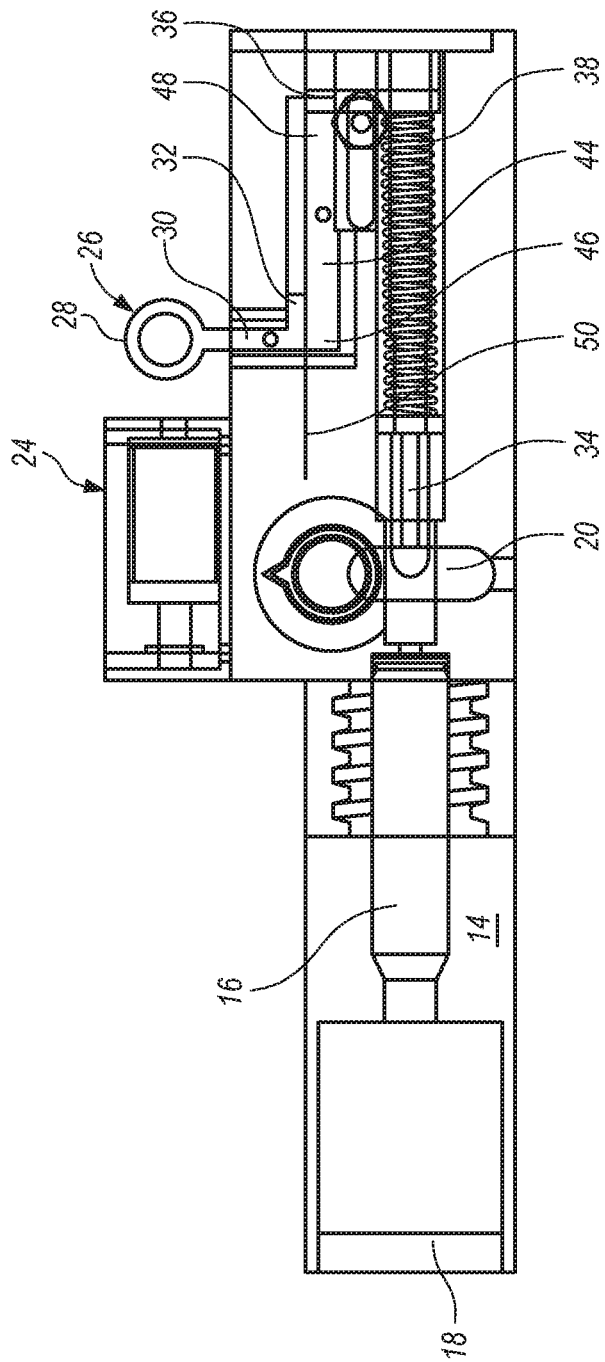
FIG. 3 is a cross-sectional view taken along line 3-3 in FIG. 1.
Figure 4:
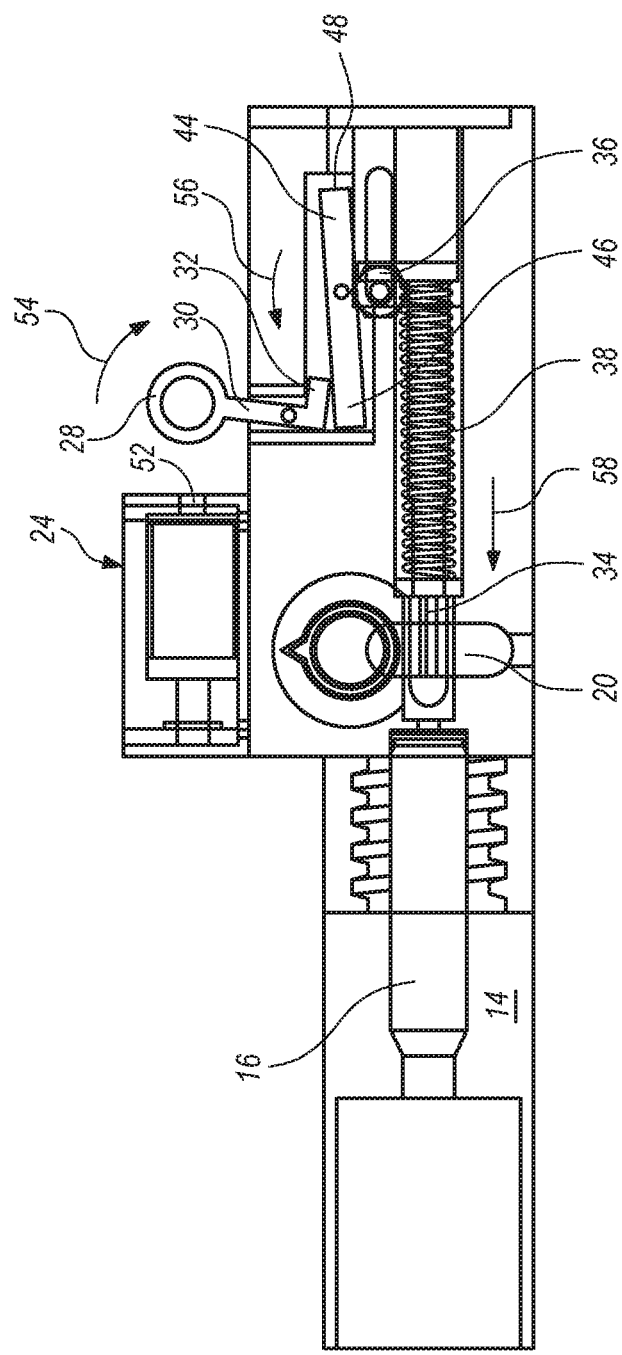
FIG. 4 is the same view as FIG. 3 once the device has fired.

Referring now to FIGS. 1, 3 and 4, the structure of the internal components of device 10 can be seen in greater detail. As shown in FIGS. 3-4, pull ring 26 can include a ring portion 28 that merges into a midsection 30, which can further merge into an elbow 32 that can extend perpendicularly from midsection 30, as shown in FIGS. 3 and 4. For assembly, midsection 30 can be pivotably attached to housing 12.

The device of the present invention can further include a firing pin 34. Firing pin 34 can be formed with a tab 36 that extends from the proximal end of firing pin 34. Firing pin can 34 can further be surrounded by a spring 38, and spring 38 can further be surrounded by a sleeve 40 that can be formed with a slot 42 at its proximal end. Once configured in this manner, tab 36 from firing pin 34 can be disposed in slot 42 (Please see FIG. 1).

The device 10 according to several embodiments can further include a lever 44, which can be pivotably mounted to housing 12. Once mounted, elbow 32 of pull ring 26 can engage lever 44 at lever ring end 46, while lever 44 can selectively engage tab 36 at tab end 48, to allow the device to transition from a cocked configuration to a fired configuration, and further to allow the device 10 to be reset as necessary to a cocked configuration.

FIG. 3 illustrates device 10 in a cocked configuration. As shown, elbow 32 is in contact with lever 44 in a manner that establishes a contact plane 50 between elbow 32 and ring end 46 of lever 44. At the other end of lever 44, tab end 48 is engaged with tab 36 of firing pin 34. Further, spring 38 can be compressed. Blank cartridge 16 can be disposed within barrel 14, and the device 10 is ready to be fired.

To establish a fired configuration (i.e., to fire the device 10), and referring primarily to FIG. 4, the operator (not shown) can inadvertently trigger a tripwire, pull line, tension release/anti-tamper or other similar mechanical means (not shown) that can be connected to ring portion 28 of pull ring 26. This can cause pull ring 26 to rotate in the direction indicated by arrow 54. Alternatively, solenoid 24 can be activated by the operator or by the operator's instructor at the instructor's discretion to extend plunger 52 to contact ring portion 28 and cause rotation of pull ring 26 in the direction of arrow 54. The solenoid activation can be electrical, via radiofrequency signal, or by other means known in the art for activating a solenoid.

Rotation of pull ring in the direction of arrow 54 can cause contra-rotation of lever 44 in the direction indicated by arrow 56 in FIG. 4. Once lever 44 rotates in the manner, tab end 48 slips off of tab 36 and disengages tab 36. This can cause spring 38 to relax, which can further cause firing pin 34 to move in the direction indicated by arrow 58 to strike cartridge 16 to thereby establish the fired configuration for device 10 and fire the device. When in a fired configuration, elbow 32 of pull ring 26 is in contact with lever 44 at a single contact point 48. To reset the device for continued training, the expended cartridge is replaced, and return bolt 22 is moved in the direction opposite from arrow 58 to compress the spring and establish the cocked configuration as described above.

Figure 5:
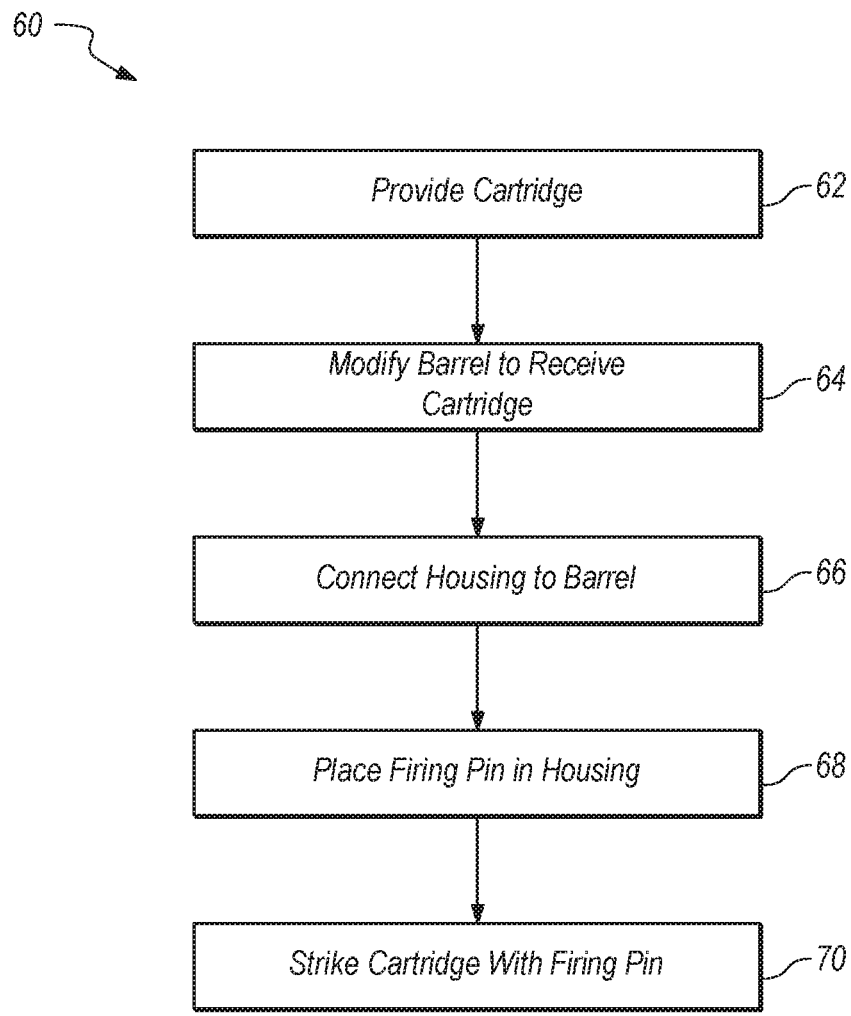
FIG. 5 is a block diagram, which illustrates steps that can be taken to accomplish the methods of the present invention according to several embodiments.

Referring now to FIG. 5, a block diagram that can depict the methods of the present invention according to several embodiments for simulating IED's for training purposes can be shown and can be annotated by reference character 60. As shown, a method 60 can include the initial step 62 of providing a cartridge blank 16. The methods can further include the step 64 of modifying a barrel 14 for receiving the cartridge blank 16, and connecting the barrel to a housing 12 to establish the structure described above, as indicated by step 66 in FIG. 5. A Firing pin 34 can be placed in the housing 12 (step 68), and firing pin 34 can selectively strike cartridge 16, as shown by step 70. The structure and cooperation of structure for causing firing pin 34 to strike cartridge 16 is described above.

The methods as described can simulate the effect of an IED, but without requiring the use of detonating charges or blasting caps. The multiple ways (activated signal using solenoid 24, or mechanical means such as tripwire, pull line, tension release tilt/anti-tamper) of using the pull ring 26 to cause firing pin 34 to strike cartridge 16 can further allow for a multitude of more realistic training scenarios. Repetitive training scenarios can also be accomplished more quickly, as resetting the device simply required replacement of the bank cartridge 16 in the barrel and resetting of firing pin 34 using bolt 22.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A training device for simulating improvised explosive devices (IED's), comprising:
    a barrel adapted to receive a blank ammunition cartridge;
    a housing connected to said barrel;
    a firing pin disposed in said housing, said firing pin having a proximal end and a distal end and a tab extending from said proximal end;
    a spring surrounding said firing pin;
    a sleeve having a proximal end and a distal end and being formed with a slot, said spring inserted into said sleeve so that said tab is disposed in said slot;
    a lever pivotably attached to said housing, said lever having a ring end and a tab end, said tab end of said lever selectively engaging said tab for engaging said firing pin; and a pull ring pivotably attached to said housing, said pull ring being selectively engaged with said ring end of said lever.

2. The training device of claim 1, wherein said pull ring has a ring portion that merges into a midsection, which further merges into an elbow perpendicular to said midsection.

3. The training device of claim 2, having a cocked configuration wherein said elbow establishes a contact plane with said lever, wherein said spring is compressed, and wherein said lever is engaged with said tab.

4. The training device of claim 2, having a fired configuration wherein said elbow is in contact with said lever at one contact point, wherein said spring is relaxed and wherein said lever is not engaged with said tab.

5. The training device of claim 4, further comprising:
a solenoid attached to said housing, said solenoid being selectively activated to pivot said pull ring to establish said fired configuration.

6. The training device of claim 4, further comprising:
a string attached to said pull ring, said string being selectively pulled to pivot said pull ring to establish said fired configuration.

7. A training device for simulating improvised explosive devices (IED's), comprising:
a firing pin, said firing pin having a proximal end and a distal end, and a tab extending from said proximal end;
a spring surrounding said firing pin;
a sleeve surrounding said spring, said sleeve having a sleeve proximal end and a sleeve distal end and being formed with a sleeve slot in said sleeve proximal end for receiving said tab;
a housing, said sleeve being disposed within said housing;
a lever pivotably attached to said housing, said lever selectively engaging said tab;
a pull ring pivotably attached to said housing, said lever selectively engaging said lever; and,
a barrel attached to said housing, said barrel sized and adapted to receive a blank ammunition cartridge, said firing pin selectively engaging said cartridge to simulate said IED's.

8. The training device of claim 7, wherein said pull ring includes a ring portion that merges into a midsection, which further merges into an elbow perpendicular to said midsection.

9. The training device of claim 8, having a cocked configuration wherein said elbow establishes a contact plane with said lever, wherein said spring is compressed, and wherein said lever is engaged with said tab.

10. The training device of claim 8, having a fired configuration wherein said elbow is in contact with said lever at one contact point, wherein said spring is relaxed and wherein said lever is not engaged with said tab.

11. The training device of claim 10, further comprising:
a solenoid attached to said housing, said solenoid being selectively activated to pivot said pull ring to establish said fired configuration.

12. The training device of claim 10, further comprising:
a tripwire attached to said pull ring, said string being selectively pulled to pivot said pull ring to establish said fired configuration.

13. A method for simulating IED's for training purposes, said method comprising the steps of:
A) providing a blank ammunition cartridge;
B) modifying a barrel to receive said blank ammunition cartridge;
C) connecting a housing to said barrel;
D) placing a firing pin in said housing, said firing pin having a proximal end and a distal end and a tab extending from said proximal end;
E1) surrounding said firing pin with a spring;
E2) inserting said spring into a sleeve, said sleeve having a sleeve proximal end and a sleeve distal end and being formed with a sleeve slot, said spring and said firing pin being inserted into said sleeve slot, so that said tab is disposed in said sleeve slot;
E3) pivotably fixing a lever to said housing, said lever having a tab end and a ring end, said step E3) being accomplished so that said tab end of said lever selectively engages said tab; and,
E4) pivotably attaching a pull ring to said housing so that said pull ring selectively contacts said ring end of said lever; and,
E5) selectively pivoting said pull ring to cause said selective contact of said pull ring and said ring end of said lever.

14. The method of claim 13, where said step E5) is accomplished using a solenoid that is attached to said housing.

15. The method of claim 13, wherein said step E5) is accomplished using a string that is attached to said pull ring.

16. The method of claim 13, wherein said pull ring and said level contra-rotate when said step E5) is accomplished.

* * * * *